(12) United States Patent
Jovic et al.

(10) Patent No.: US 7,121,298 B2
(45) Date of Patent: Oct. 17, 2006

(54) REDUCER VALVE FOR PRESSURIZED GAS

(75) Inventors: Milan Jovic, Börnsen (DE); Carsten Mantey, Wulsfelde (DE)

(73) Assignee: Dräger Aerospace GmbH, Lübeck (DE)

( * ) Notice: Subject to any disclaimer, the term of this patent is extended or adjusted under 35 U.S.C. 154(b) by 370 days.

(21) Appl. No.: 10/423,868

(22) Filed: Apr. 28, 2003

(65) Prior Publication Data
US 2004/0055643 A1 Mar. 25, 2004
(Under 37 CFR 1.47)

(30) Foreign Application Priority Data
Apr. 27, 2002  (DE)  ......................... 102 19 007

(51) Int. Cl.
A62B 9/02 (2006.01)
G05D 16/10 (2006.01)

(52) U.S. Cl. ............. 137/505.38; 137/505; 137/505.25; 137/508; 137/614.17; 137/614.2

(58) Field of Classification Search ................. 137/505, 137/505.25, 505.41, 508, 614.17, 614.2, 137/505.38
See application file for complete search history.

(56) References Cited

U.S. PATENT DOCUMENTS

| 2,192,141 | A | * | 2/1940 | McElwaine | 137/505.23 |
| 2,514,458 | A | * | 7/1950 | Sinz | 137/505.25 |
| 3,522,818 | A | | 8/1970 | Suchy | |
| 5,522,422 | A | * | 6/1996 | Beck | 137/505.25 |
| 5,860,448 | A | * | 1/1999 | Lee et al. | 137/508 |
| 6,167,908 | B1 | | 1/2001 | Röttger | |

FOREIGN PATENT DOCUMENTS

| DE | 1708117 | 4/1971 |
| EP | 0112765 | 7/1984 |
| GB | 2182421 | 5/1987 |
| GB | 2269441 | 2/1994 |
| WO | WO 98/19761 | 6/1996 |

* cited by examiner

Primary Examiner—Stephen M. Hepperle
(74) Attorney, Agent, or Firm—Walter Ottesen

(57) ABSTRACT

A reducer valve for pressurized gas includes a piston (2) displaceably mounted in a valve housing (3) against the force of a pressure spring (8). At one end, the piston (2) is subjected to pressure by the back pressure via a control pressure line (20) whereby the gas, which flows in from a pressurized gas source via a gas inlet (17), is throttled. The reducer valve is improved so that a specific gas volume remains in the connected pressurized gas source below a minimum pressure. A directional valve (24, 25) is provided in the control pressure line (20) and opens above a predetermined limit pressure.

4 Claims, 1 Drawing Sheet

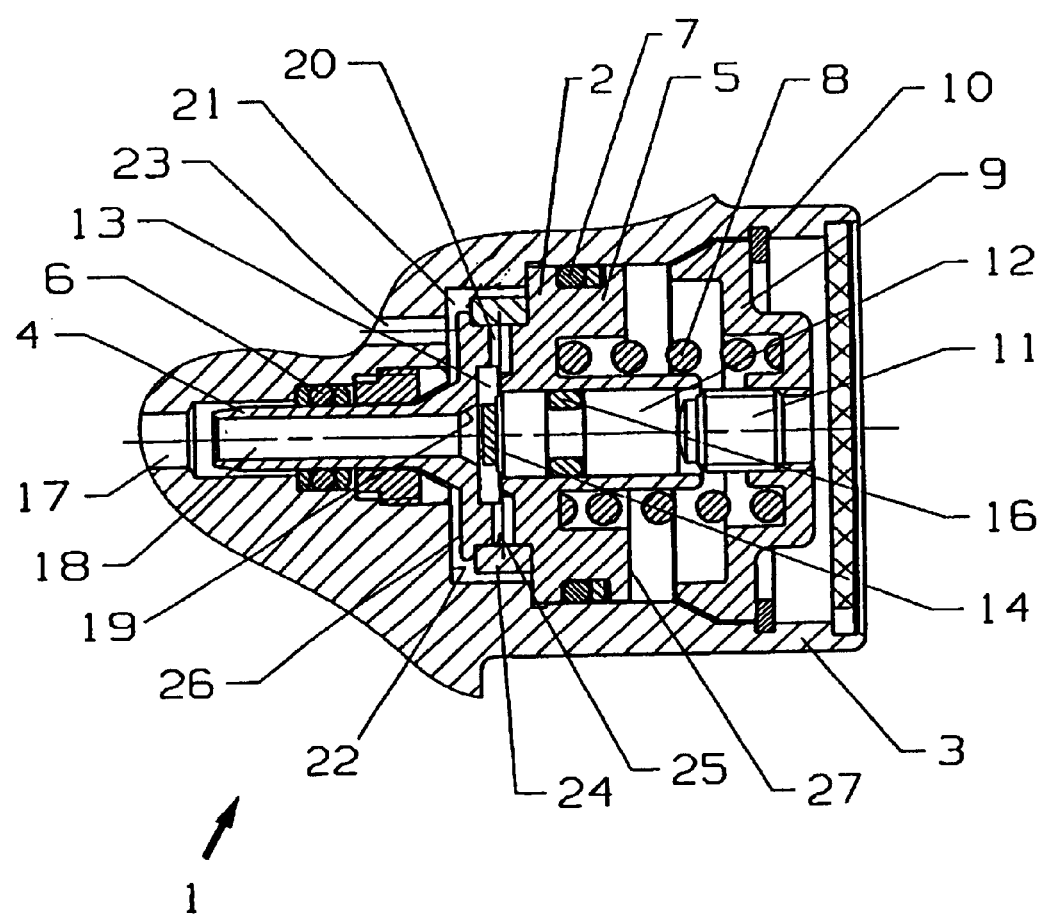

REDUCER VALVE FOR PRESSURIZED GAS

FIELD OF THE INVENTION

The invention relates to a reducer valve for pressurized gas in a respirating apparatus.

BACKGROUND OF THE INVENTION

A reducer valve is disclosed in U.S. Pat. No. 3,522,818 and adjusts an approximately constant back pressure independently of the pressure present in the pressurized-gas source. A piston having a valve body configured with a cylindrical shape is displaceably mounted in a valve housing against the force of a compression spring. The forward end of the valve body is provided with a seal disc with which a valve seat within the valve housing can be closed. The pressurized gas, which is at high pressure, flows via the valve seat into the valve housing and is correspondingly throttled depending upon the position of the valve body relative to the valve seat and reaches, via an outflow opening, a consumer connected downstream. The consumer can, for example, be in the form of an automatic lung which emits respirating gas to a carrier of an apparatus as required.

At one end, the piston is subjected to the pressure which is present at the outflow end of the valve body whereby the piston and the valve body are moved in a direction toward the valve seat. For this purpose, a closed volume is formed as a control pressure volume between one end of the piston and the inner surface of the valve housing. The control pressure space is connected to the pressure space downstream of the valve body. In this way, the control pressure space is charged with the back pressure present in the region of the outflow opening. The other end of the piston is at ambient pressure level. With increasing back pressure, the pressure in the control pressure space likewise increases so that a larger force acts on the piston and the valve body and the gas, which flows in via the valve seat, is correspondingly throttled until the back pressure again decreases.

It is disadvantageous in the known reducer valve that the valve body is moved away from the valve seat by the pressure spring for the case that the pressure in the pressurized gas source has dropped below the back pressure and the total residual gas can flow out of the pressurized gas source. Pressurized gases often still contain a certain residual moisture. For this reason, a condensation of water vapor can occur within the pressurized gas source whereby corrosion within the pressurized gas source is facilitated.

SUMMARY OF THE INVENTION

It is an object of the invention to provide a reducer valve of the above kind which is so improved that a predetermined gas volume remains under a minimum pressure in the connected pressurized gas source.

The reducer valve of the invention is for pressurized gas and includes: a valve housing having an inner wall surface defining an interior space; a piston displaceably mounted in the interior space of the valve housing; a pressure spring interposed between the housing and the piston for imparting a biasing force to the piston; the piston including a first piston section having a first outer diameter and a second piston section having a second outer diameter greater than the first outer diameter; the piston including a piston inner space defining a valve seat and a pressurized gas inflow channel leading to the valve seat; and, a valve body configured to close the valve seat; the valve body being operatively connected to the valve housing and mounted in the piston inner space so as to be displaceable relative to the piston; the inner wall surface and the second piston section conjointly defining a control pressure space; the housing having an outlet opening for conducting the pressurized gas to a consumer and the outlet opening communicating with the control pressure space; the piston having a control pressure line formed therein for connecting the pressure control space to the piston inner space so as to allow the pressurized gas to flow from the piston inner space to the control pressure space; the control pressure space being dimensioned so as to cause the second piston section to be subjected to a resultant force because of the pressurized gas which resultant force counters the force of the pressure spring and causes a movement of the piston with the valve seat toward said valve body thereby throttling the flow of the pressurized gas flowing in via the inflow channel; and, a directional valve at the control pressure line with the directional valve opening toward the control pressure space above a predetermined limit pressure whereby a specific minimum pressure is maintained in the inflow channel.

The advantage of the invention is that a specific minimum pressure remains in the pressurized gas vessel mounted ahead of the valve because of a directional valve within the control pressure line which makes possible a gas flow into the control pressure space only above a specific opening pressure. The opening pressure of the directional valve is so adjusted that an outflow of gas from the pressurized gas source is interrupted when the pressure has reached a minimum pressure.

BRIEF DESCRIPTION OF THE DRAWINGS

The invention will now be described with respect to the single FIGURE of the drawing which shows a reducer valve of the invention in longitudinal section.

DESCRIPTION OF THE PREFERRED EMBODIMENTS OF THE INVENTION

The reducer valve 1 shown in the FIGURE has an axially displaceable piston 2 within a valve housing 3. The piston 2 comprises a tubular-shaped first piston section 4 and a second piston section 5 which extends from the first piston section. The outer diameter of the second piston section 5 is greater than the outer diameter of the first piston section 4. The piston sections (4, 5) are sealed with respect to the valve housing 3 by means of seal elements (6, 7), respectively. The second piston section 5 is braced against a valve cover 9 by means of a pressure spring 8. The pressure spring 8 is fixed by a retainer ring 10 in the valve housing 3. An adjusting screw 11 for a valve body 12 is disposed in the valve cover 9. The valve body 12 projects into a piston inner space 13 of the second piston section 5 and has a seal disc 14 on its front end. The valve body 12 is guided gas tight within the second piston section 5 by a seal ring 16. High pressure gas arrives in the piston inner space 13 of the second piston section 5 via a gas inlet 17 and through an inflow channel 18 in the first piston section 4.

The inflow channel 18 ends at a valve seat 19 which is arranged opposite to the seal disc 14 of the valve body 12 so that the valve seat 19 can be closed with an appropriate position of the valve body 12. A control pressure line 20 branches from the piston interior space 13 of the second piston section 5. The control pressure line 20 is connected to a control pressure space 21 which is delimited by a piston end 26 of the second piston section 5 and a valve housing inner wall 22. The pressurized gas reaches a consumer (not shown) from the control pressure space 21 via an outlet opening 23.

An outlet opening 25 at the end of the control pressure line 20 is closed by an elastomeric ring 24 which only clears the gas path from the piston inner space 13 of the second piston section 5 into the control pressure space 21 when a difference pressure of approximately 1 bar is exceeded.

A piston surface 27 of the second piston section 5 lies opposite the piston end 26 and is at the ambient pressure level so that a force is developed against the pressure spring 8 by the pressure present in the control pressure space 21. The pressure spring 8 moves the piston 2 in the direction toward the valve body 12 so that the gas flow, which flows in via the inflow channel 18, is throttled. In this way, a drop of the pressure in the control pressure space 21 also results.

The position of the valve body 12 can be changed relative to the valve seat 19 with the adjusting screw 11 and, in this way, the pressure in the control pressure space 21 is adjusted. A specific minimum pressure in the inflow channel 18 is maintained by the elastomeric ring 24 so that a pressurized gas vessel can only be emptied up to a residual pressure. The pressurized gas vessel (not shown) is connected to the gas inlet 17.

It is understood that the foregoing description is that of the preferred embodiments of the invention and that various changes and modifications may be made thereto without departing from the spirit and scope of the invention as defined in the appended claims.

What is claimed is:

1. A reducer valve for pressurized gas, the reducer valve comprising:

a valve housing having an inner wall surface defining an interior space;

a piston displaceably mounted in said interior space of said valve housing;

a pressure spring interposed between said housing and said piston for imparting a biasing force to said piston;

said piston including a first piston section having a first outer diameter and a second piston section having a second outer diameter greater than said first outer diameter;

said piston including a piston inner space defining a valve seat and a pressurized gas inflow channel leading to said valve seat; and, a valve body configured to close said valve seat;

said valve body being operatively connected to said valve housing and mounted in said piston inner space so as to be displaceable relative to said piston;

said inner wall surface and said second piston section conjointly defining a control pressure space;

said housing having an outlet opening for conducting said pressurized gas to a consumer and said outlet opening communicating with said control pressure space;

said piston having a control pressure line formed therein for connecting said control pressure space to said piston inner space so as to allow said pressurized gas to flow from said piston inner space to said control pressure space;

said control pressure space being dimensioned so as to cause said second piston section to be subjected to a resultant force because of said pressurized gas which resultant force counters the force of said pressure spring and causes a movement of said piston and therefore of said valve seat toward said valve body thereby throttling the flow of said pressurized gas flowing in via said inflow channel; and, a directional valve at said control pressure line with said directional valve opening toward said control pressure space above a predetermined limit pressure whereby a specific minimum pressure is maintained in said inflow channel.

2. The reducer valve of claim 1, wherein said control pressure line terminates in a valve opening in said control pressure space; and, said directional valve includes said valve opening and an elastomeric annular member which closes said valve opening.

3. The reducer valve of claim 2, wherein said directional valve has an opening pressure equal to or greater than 1 bar.

4. The reducer valve of claim 2, wherein said directional valve consists of said valve opening and an elastomeric annular member which closes said valve opening.

* * * * *